(12) United States Patent
Lindblad et al.

(10) Patent No.: US 6,288,007 B1
(45) Date of Patent: Sep. 11, 2001

(54) HYDROGENATION CATALYST WITH HIGH SULPHUR TOLERANCE

(75) Inventors: Marina Lindblad; Aimo Rautiainen, both of Helsinki; Göran Sandström, Hinthaara, all of (FI)

(73) Assignee: Fortum Oil & Gas Oy, Espoo (FI)

( * ) Notice: Subject to any disclaimer, the term of this patent is extended or adjusted under 35 U.S.C. 154(b) by 0 days.

(21) Appl. No.: 09/446,035

(22) PCT Filed: Jun. 16, 1998

(86) PCT No.: PCT/FI98/00521

§ 371 Date: Dec. 15, 1999

§ 102(e) Date: Dec. 15, 1999

(87) PCT Pub. No.: WO98/57742

PCT Pub. Date: Dec. 23, 1998

(30) Foreign Application Priority Data

Jun. 16, 1997 (FI) .......................................... 972545

(51) Int. Cl.⁷ .............................. B01J 21/12; B01J 23/40; B01J 23/42; B01J 23/44

(52) U.S. Cl. ..................... 502/261; 502/232; 502/237; 502/238; 502/240; 502/258; 502/262; 502/263; 502/325; 502/332; 502/333; 502/334

(58) Field of Search ..................... 502/232, 237, 502/238, 240, 258, 261, 262, 263, 325, 332, 333, 334

(56) References Cited

U.S. PATENT DOCUMENTS

| | | |
|---|---|---|
| 3,269,939 | 8/1966 | Marechal et al. . |
| 3,703,461 | 11/1972 | Hansford et al. . |
| 4,013,590 | 3/1977 | Buonomo et al. . |
| 4,538,008 * | 8/1985 | Firth et al. ............................. 568/783 |
| 4,721,696 * | 1/1988 | Kidd ...................................... 502/210 |
| 4,778,779 * | 10/1988 | Murrell et al. ........................ 502/263 |
| 4,966,682 | 10/1990 | Baird, Jr. et al. . |
| 5,114,562 | 5/1992 | Haun et al. . |
| 5,214,018 * | 5/1993 | Forlani et al. ........................ 502/263 |
| 5,994,258 * | 11/1999 | Buonomo et al. ................... 502/243 |

FOREIGN PATENT DOCUMENTS

| | | |
|---|---|---|
| 0511264 | 8/1995 | (EP) . |
| 0525503 | 3/1999 | (EP) . |
| 1501346 | 2/1978 | (GB) . |
| 9110510 | 7/1991 | (WO) . |
| 92/16601 | 10/1992 | (WO) . |
| 96/09360 | 3/1996 | (WO) . |

OTHER PUBLICATIONS

Catal. Rev. –Sci. Eng., 36(1), 75–123 (1994) Stanislaus et al "Aromatic Hydrogenation Catalysis: A Review".

* cited by examiner

*Primary Examiner*—Elizabeth D. Wood
(74) *Attorney, Agent, or Firm*—Birch, Stewart, Kolasch & Birch, LLP

(57) ABSTRACT

A catalyst with a high sulphur tolerance for the hydrogenation of middle distillate aromatics which comprises as a support (a) an alumina, the surface of which has been modified by contacting it with a silicon-containing compound, or (b) a silica, the surface of which has been modified by contacting it with an aluminum-containing compound. The support has been treated with air, oxygen or water vapor at an elevated temperature in order to convert the said silicon-containing compound or the said aluminum-containing compound to oxide form. The hydrogenating component of the catalyst is one or more metals of the platinum group.

32 Claims, 1 Drawing Sheet

Conversions (%) of the platinum catalysts prepared in Examples 4-9, in a sulfur-containing feed as a function of temperature (°C).

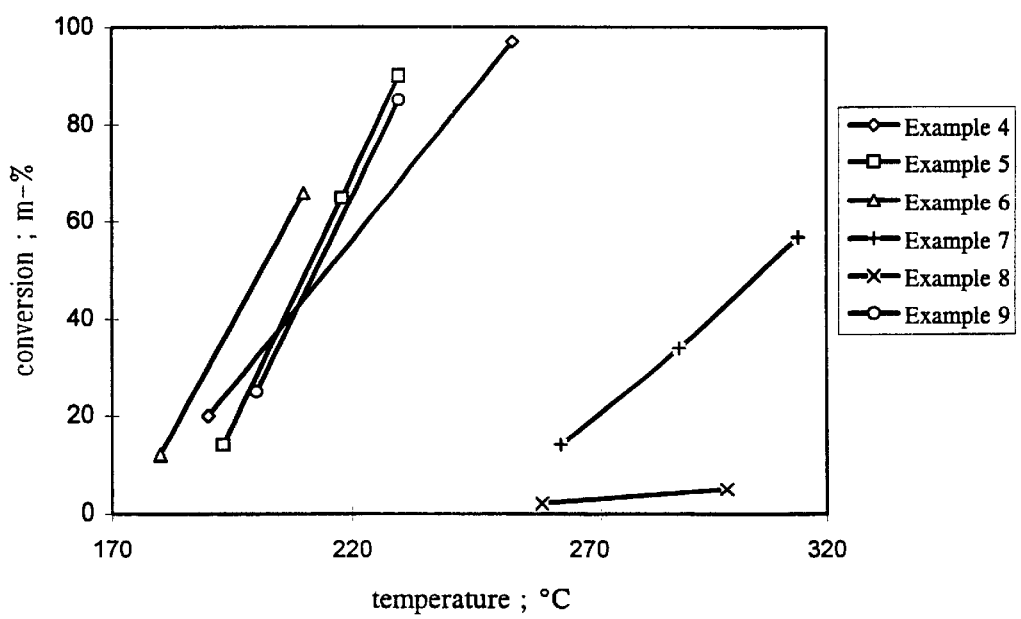
Conversions (%) of the platinum catalysts prepared in Examples 4-9, in a sulfur-containing feed as a function of temperature (°C).

HYDROGENATION CATALYST WITH HIGH SULPHUR TOLERANCE

This application is the national phase under 35 U.S.C. §371 of PCT International Application No. PCT/FI98/00521 which has an International filing date of Jun. 16, 1998 which designated the United States of America.

BACKGROUND OF THE INVENTION

1. Field of the Invention

The present invention relates to the preparation of noble metal catalysts having high sulphur tolerance for the hydrogenation of aromatic compounds present in middle distillates. In particular, the invention concerns a catalyst with high sulphur tolerance and comprising a noble metal on a surface-modified alumina or silica support. The new catalysts can be used for hydrogenation of middle distillate aromatics to obtain diesel fuel.

2. Description of Related Art

Nickel-based catalysts have been conventionally used for the hydrogenation of aromatic compounds. The performance of these catalysts in a sulphur-containing feed deteriorates with time owing to poisoning of nickel. The activity of the catalysts is not restored when changing a sulphur-containing feed to a pure, i.e. no sulphur compounds containing, feed (irreversible process). Regeneration of nickel catalysts with hydrogen is not successful either. Owing to very low sulphur tolerance and inability to be regenerated nickel-based catalysts are in general not used with sulphur-containing feeds.

An alumina-based noble metal catalyst, for example platinum on gamma-alumina, is known to have high catalytic activity in hydrogenation of aromatic compounds. However, it is also very sensitive to sulphur, and therefore it is necessary to decrease the amount of sulphur in the feed to a very low level (<5 ppm). Contrary to nickel, the activity of a platinum catalyst is restored when changing sulphur-containing feed to a pure, i.e. no sulphur compounds containing, feed (reversible process).

It is already known that the amount of sulphur in the feed can be increased if the acidity of the support of a noble metal catalyst is increased, for example, by changing an alumina support to the amorphous silica-alumina support. Below, there is a brief description of the patents in which the sulphur tolerance of platinum-based hydrogenation catalysts has been improved by adding platinum onto a silica-alumina mixed oxide (U.S. Pat. No. 3,269,939), onto a supported silica-alumina (U.S. Pat. No. 3,703,461) and onto a dealuminized silica-alumina (GB 1,501,346).

U.S. Pat. No. 3,269,939 teaches a silica-alumina support for a platinum based (0.75 wt. % Pt) catalyst, having a silica content in the range of 75 to 90 wt. % ($SiO_2/Al_2O_3$ mole ratio=86/14). According to the reference, the use of silica-alumina as the support renders the catalyst more tolerant to sulphur as compared with alumina alone or silica-alumina in which the $SiO_2/Al_2O_3$ mole ratio is reversed (12/88). The enhancement of hydrogenation which breaks down sulphur compounds on the support concerned is assumed to be the reason for the better sulphur tolerance of the catalyst. The sulphur tolerance of the catalyst at different sulphur concentrations is presented in an example in which a feed containing 17 vol. % aromatics was hydrogenated (T=300° C., p=35 bar, space velocity=6 $hr^{-1}$, hydrogen to oil ratio= 500 Nl/1). When the sulphur contents in the feed were 50 ppm and 300 ppm, the conversions of the aromatics were 62% and 44%, respectively.

U.S. Pat. No. 3,703,461 describes a support comprising a large-pore alumina gel into which a silica-alumina cogel or copolymer is dispersed. The noble metals are added to the support by the ion exchange method in order to achieve good dispersion. When using suitable silica-alumina mixtures, a sufficient number of ion exchange sites are obtained for the noble metals, and the large pores ensure that the well dispersed noble metals are also available. According to the patent, the noble metals are in effective use, owing to synergy between the large-pore support and the ion exchange method. Furthermore, the improved sulphur tolerance of the catalyst concerned (0.6 wt. % Pt) as compared with a commercial reformation catalyst (0.55 wt. % Pt/$Al_2O_3$) is shown by means of an example. When the sulphur content in the feed was 73 ppm during a 700-hour run, the hydrogenation of aromatics (19 vol. %) remained complete (T=315° C., p=75 bar, space velocity=2.3 $hr^{-1}$, hydrogen to oil ratio=980 Nl/1). In a corresponding run the conversion level of the reference catalyst decreased steadily.

GB 1,501,346 discloses a sulphur-tolerant noble metal catalyst, the support of which is dealuminized silica-alumina. It is stated that the high sulphur tolerance of the catalyst is based on the optimal surface structure produced in the dealumination of the support, the acidity of the surface being here of crucial importance. In the examples, the sulphur tolerance of the platinum catalysts (0.1–0.8 wt. % Pt) was tested by using the feeds in which sulphur content ranged from 80 to 500 ppm. When the sulphur content in the feed was 500 ppm, a catalyst containing 0.6 wt. % platinum hydrogenated (T=320° C., p=50 bar, space velocity=4.0 $hr^{-1}$, hydrogen to oil ratio=1000 Nl/1) 90% of the aromatics (initially 22.8 wt. %).

It is known that the acidity of the alumina support surface can also be increased by using, for example, the oxides of boron ($B_2O_3$), phosphorus ($PO_x$) niobium ($Nb_2O_5$), titanium ($TiO_2$), tungsten ($WO_3$) and zirconium ($ZrO_2$). The same oxides are also suitable for increasing the acidity of the silica support, as is the adding of, for example, gallium oxide ($Ga_2O_3$) and lanthanum oxide ($La_2O_3$). The above-mentioned oxides mixed together also form oxide structures which have an acidic nature.

For the hydrogenation of middle distillate aromatics there have been developed zeolite-based (crystalline silica-alumina) noble metal catalysts (Pd, Pt and a mixture thereof) which have a higher tolerance of sulphur and nitrogen than have noble metal catalysts based on alumina and silica-alumina. The support is most commonly Y-type zeolite or mordenite. It has been suggested in the art that the sulphur tolerance of zeolite-based catalysts would be based on an electron deficiency of the noble metal particles, caused by the zeolite structure, in which case the strength of the bond between the noble metal and sulphur is weakened (A. Stanislaus and B. H. Cooper, Catal. Rev.—Sci. Eng. 36 (1994) 75). For the hydrogenation of aromatic compounds, it is also possible to use molecular sieves, for example MCM-41$Al_2O_3$, in which noble metals of Group VIII of the Periodic Table act as the catalytically active metals.

U.S. Pat. No. 5,114,562, WO92/16601 and WO96/09360 describe two-step processes wherein aromatics are hydrogenated with noble metal catalysts after the removal of sulphur. The supports proposed include both zeolite type and non-zeolite type (such as alumina and amorphous silica-alumina) oxide materials. However, these publications do not discuss the differences caused by different supports in the sulphur tolerance of the noble metal catalysts.

In order to complete the survey of related art, it should be mentioned that a method for improving thermal and mechanical stability of alumina by treating it with a silicon compound is disclosed in U.S. Pat. No. 4,013,590. According to said reference the aluminum oxide is impregnated with the silicon compound or a solution thereof, the impregnated aluminum oxide is dried and then subjected to oxidation. There is no indication of the suitability of the thus treated alumina for use as a support for nobel metal catalysts employed for hydrogenation of sulphurous feeds.

SUMMARY OF THE INVENTION

It is an object of the present invention to provide a hydrogenation catalyst for aromatics which has a high sulphur tolerance, which is based on noble metals (Pd, Pt or a mixture thereof), and which is less expensive to manufacture than are the zeolite-based catalysts. The use of inexpensive and easily available alumina and silica supports is taken as a starting point.

It is another object of the invention to provide a process for producing hydrogenation catalyst with improved sulphur tolerance.

These and other objects, together with the advantages thereof over known catalysts, which shall become apparent from specification which follows, are accomplished by the invention as hereinafter described and claimed.

According to the invention, it has been observed that by modifying the surface of an alumina support with silicon compounds or the surface of a silica support with aluminum compounds, via either a liquid phase (impregnation) or a gas phase, by treating the structures thus obtained by means of either air or water, and by bonding a noble metal to a support thus obtained, it is possible to form a hydrogenation catalyst having considerably better activity in dearomatization and considerably higher sulphur tolerance than have the unmodified supports. Although we do not wish to be bound by any specific theory, it would appear that the modification procedure successfully adjusts the acidity of the original support surfaces to the level which is advantageous for the aromatics hydrogenation process and for the sulphur tolerance of the noble metals.

The surface-modified supports according to the invention are obtained by growing a second oxide in the pores of an oxide support material. In this respect, the method differs clearly from the supports used for noble metals in the patents U.S. Pat. No. 3,269,939, U.S. Pat. No. 3,703,461 and GB 1,501,346 described above, in which supports are silica-alumina mixed oxides. A common method of preparing mixed oxides is the coprecipitation of the oxide components. The surface structures of surface-modified supports and mixed-oxide supports are formed via highly different mechanisms. The surface properties of the support can be regulated in a controlled and reproducible manner by surface modification. It is known that the composition of mixed oxides is highly sensitive to the manufacturing parameters which may lead especially to the changes in surface composition.

More specifically, the catalyst according to the present invention is mainly characterized by what is stated in the characterizing part of claim 1.

The process according to the invention is characterized by what is stated in the characterizing part of claim 17.

Considerable advantages are obtained by means of the invention. Thus, the performance achieved by using noble metal catalysts on alumina or silica supports modified according with the invention in the hydrogenation of toluene in model-substance feed is as good as with the Y-type zeolite-containing catalyst included in the comparison. This comparison gives an estimate of the sulphur tolerance level achievable by said modifications. Since the surface modifications can be carried out using inexpensive silicon and aluminum compounds in easily controllable conditions, the method according to the invention for preparing noble metal catalysts can be deemed to be highly competitive.

BRIEF DESCRIPTION OF THE DRAWING

FIG. 1 indicates the conversions (%) of the platinum catalysts prepared in Examples 4–9, in a sulphur-containing feed as a function of temperature (° C.).

DETAILED DESCRIPTION OF THE INVENTION

The present catalyst with a high sulphur tolerance for the hydrogenation of middle distillate aromatics, comprises as a hydrogenating component one or more metals of the platinum group. The support is (a) an alumina, the surface of which has been modified by contacting it with a silicon-containing compound, or (b) a silica, the surface of which has been modified by contacting it with an aluminum-containing compound, which has been converted to the corresponding oxide form by treating the support with the deposited silicon or aluminum compound with air, oxygen or water.

The surface modifications according to the invention are carried out on an alumina or silica support. Before the modification procedure the support is subjected to a surface-stabilizing treatment by heating it for several hours at a temperature of 200–900° C.

In the following, the various features of the present catalysts and the process for the preparation thereof will be examined in more detail:

Use of alumina modified with a silicon compound as a support

According to the first embodiment of the invention, the catalyst comprises, as the support, an alumina which has been surface modified by treating it with a compound which contains silicon, said treatment being followed by a treatment with air or water and, as the hydrogenating component, one or more noble metals. Recommended forms of the alumina support are eta, gamma and theta phases and various mixtures thereof.

According to the invention, the alumina support is modified with a silicon compound. The silicon compounds used may be, for example, silicon tetrachloride $SiCl_4$, silicon alkoxides, such as tetramethoxysilane $Si(OMe)_4$ and tetraethoxysilane $Si(OEt)_4$, and compounds formed by silicon and organic compounds, such as 1,1,1,3,3,3-hexamethyldisilazane (HMDS) $(CH_3)_3SiNHSi(CH_3)_3$. The silicon compound is introduced into the alumina surface either by impregnation or from a gas phase.

In the impregnation method the support is first impregnated with a solution of a silicon compound, then the silicon compound bonded to the support is treated at an elevated temperature with either air or water in order to convert it to oxide form. The amount of silicon oxides on alumina may be regulated by using sequential impregnation. In the gas phase method, a vaporous silicon compound is allowed to react with the support at a temperature which is sufficiently high to prevent the condensation of the silicon compound and sufficiently low in order not to decompose the silicon compound. The suitable temperature can be selected from a temperature range of 20–600° C., preferably 20–300° C. Thereafter the support is treated with air or water vapor at an elevated temperature in order to form silicon oxides on the surface of the support. The amount of silicon oxides on alumina support can be regulated by repeating the said cycles (silicon compound+air/water).

The suitable temperature for the air or water treatment, wherein a silicon compound introduced onto the support via either a liquid phase or a gas phase is converted to oxide form, can be selected form a temperature range of 20–600° C., preferably 300–600° C. Water can be used advantageously in connection with halogen-containing compounds (e.g. chlorides) and with alkyl compounds. Air or oxygen is effective for the combustion of organic ligand species.

The suitable amount of silicon oxides on alumina support may at the end of the treatment or treatments be 0.1–30 wt. % Si, preferably 0.5–10 wt. % Si.

Use of silica modified with an aluminium compound as a support

Similarly, when the support used is silica, the surface of the support is modified with an aluminium compound via either a liquid phase (impregnation) or a gas phase. The aluminium compounds used may be, for example, aluminium chloride $AlCl_3$, aluminium nitrate $Al(NO_3)_3$, or metalorganic compounds, such as aluminium ethoxide $Al(OEt)_3$, aluminium(III) acetylacetonate $Al(C_5H_7O_2)_3$, tris (2,2,6,6-tetramethyl-3,5-heptane-dionato)aluminium $Al(C_{11}H_{19}O_2)_3$, or organometallic compounds, such as trimethyl-aluminium $Al(CH_3)_3$ and triethylaluminium $Al(C_2H_5)_3$. The aluminium compound introduced onto the silica surface is treated at an elevated temperature with either air or water in order to convert it to aluminium oxides. The amount of aluminium oxides on silica can be regulated by using sequential impregnation or several (aluminium compound+air/water) cycles. The same conditions as described above in the growing of silicon oxides on an alumina support can be used both in the adding of aluminium compounds onto a silica support and in the air/water treatments.

The suitable amount of aluminium oxides on silica may after the treatment or treatments be 0.1–30 wt. % Al, preferably 0.5–10 wt. % Al.

Adding of noble metals onto a modified support

Thereafter, a noble metal (typically platinum, palladium or a mixture thereof) is bonded to the modified supports, via either a liquid phase (impregnation) or a gas phase in order to prepare a catalyst suitable for the hydrogenation of aromatic compounds. The platinum compound used may be an aqueous solution of hexachloroplatinic acid $H_2PtCl_6$, tetraammineplatinum(II) chloride $[Pt(NH_3)_4]Cl_2$, or preferably tetraammineplatinum(II) nitrate $[Pt(NH_3)_4](NO_3)2$. Thereafter the catalyst is dried and calcined in a conventional manner. Platinum can be bonded via gas phase by using, for example, platinum(II) acetylacetonate $Pt(C_5H_7O_2)_2$ or bis(2,2,6,6-tetramethyl-3,5-heptanedionato) platinum $Pt(C_{11}H_{19}O_2)_2$ as precursor. The suitable bonding temperature can be selected from a temperature range of 100–300° C., preferably 150–250° C.

The palladium compound used may be, for example, an aqueous solution of palladium chloride $PdCl_2$ or palladium nitrate $Pd(NO_3)2$. Thereafter the catalyst is dried and calcined, as above, in a conventional manner. Palladium can be bonded via gas phase by using, for example, bis(2,2,6,6-tetramethyl-3,5-heptanedionato)palladium $Pd(C_{11}H_{19}O_2)_2$ as precursor. After the bonding of the noble metal, the catalyst is calcined in air at a temperature of at maximum 500° C.

The noble metal content can be selected within a wide range. The suitable noble metal content is 0.1–10 wt. %, preferably 0.3–3 wt. %.

The catalysts prepared according to the invention can be used for the hydrogenation of aromatics both in sulphur-free and sulphur-containing feeds. The surface state achieved by modifications improves the sulphur tolerance of the catalysts. By the method disclosed in the present invention, alumina and silica supports can be modified quite easily via liquid phase or gas phase, and thereby obtain a support which can, after the addition of a noble metal or noble metals, act as a catalyst in the hydrogenation of aromatics both in a sulphur-free and a sulphur-containing feed at low temperatures.

Surface-bond selective gas-phase reactions

As noted above, the silicon or aluminium compounds as well as the noble metal compounds can be bonded to the support (or substrate) from gas phase by evaporating the corresponding precursor and contacting the vapourized species with the surface of the substrate at "surface-bond-selective" conditions. In the context of the present invention, this term refers to a technique of attaching the reactant in vapour phase to the surface of a solid material (inorganic oxide) under conditions in which the properties of the surface determine the amount of reactant attached to the surface. The preparation of catalysts under surface-bond-selective conditions is described, e.g., in FI Pat. Nos. 84562 and 87892.

During the reaction, the support is maintained at a temperature which is above the vapour condensation temperature, and simultaneously, so high that the minimum thermal activation energy, which is necessary for the formation of chemical bonds between the heterogenizing compound and the surface bond sites of the support, is attained (thus accomplishing the chemisorption of the heterogenizing compound). Through this technique, a support suitable for bonding the transition metal species is achieved.

The term "surface-bond site" refers to a functional group on the support surface that is capable of reacting with the transition metal or a compound thereof. Such groups are hydroxyl groups and metal-oxide-bridges on the surface.

EXAMPLES

In accordance with the invention, the acidity level of a catalyst support was adjusted to a level advantageous in the aromatics hydrogenation process by growing silicon oxides on the surface of an alumina support and aluminium oxides on the surface of a silica support. By changing the acidity of the support surface via modification procedure it is possible directly affect to the sulphur tolerance of the catalysts as compared with pure, i.e. unmodified, supports. The noble metal (typically platinum) was bonded to a modified support via either a liquid phase (impregnation) or a gas phase. The impregnation was typically done from an aqueous solution of tetraammineplatinum(II) nitrate, $[Pt(NH_3)_4](NO_3)2$. The catalysts prepared were tested in a microreactor with a model-substance feed (hydrogenated tall oil fatty acid (TOFA-HYD), to which approx. 3 wt. % toluene had been added) both in a sulphur-free and a sulphur-containing feed. The sulphur-containing feed was obtained by mixing with the feed approx. 50 ppm of sulphur as benzothiophene. The activity of the catalyst at different temperatures was measured, and the lowest temperature where the catalyst hydrogenated toluene at a certain conversion level was used as a performance indicator. The lower the temperature required for achieving the desired conversion level, the better the catalyst. After the sulphur-containing feed, the activity of the catalyst was re-measured in a sulphur-free feed. This was done in order to ensure that the catalyst returned to its original state after the feeding in of sulphur (reversible process). As a comparison, platinum catalysts prepared on unmodified supports, both alumina and silica, were tested in conditions corresponding to those described above. In addition, a zeolite-based platinum catalyst prepared by impregnating a commercial Y-zeolite with platinum was included in the microreactor runs.

The activities of the various catalysts were thereafter compared. On the basis of the microreactor runs, both in a sulphur-free and a sulphur-containing feed the platinum catalysts prepared on modified supports according to the invention had clearly better catalytic activity than those catalysts prepared on corresponding unmodified supports. In these model-substance tests, the performance of the catalysts prepared according to the invention was at the same level as the Y-zeolite-based platinum catalyst.

Example 1

Preparation of a silicon oxide-modified alumina support via gas phase

The support used was a commercial alumina ($\gamma$-$Al_2O_3$, AKZO 000-1.5E) which was grounded and sieved to a particle size of 0.25–0.5 mm. It was heat-treated in air at a temperature of 600° C. for several hours in order to stabilize the surface structure. After the heat-treating alumina BET surface area of 180 $m^2$/g and pore volume of 0.5 $cm^3$/g was determined by a nitrogen sorption method.

Pre-treated alumina was packed into the reaction chamber of a fixed-bed flow-type reactor operating at an atmospheric pressure, where it was further heated in a nitrogen flow in order to remove any moisture physisorbed on to the support. Thereafter the support material was contacted with the gas of a well vaporizing silicon compound having a high vapor pressure in the conditions used. The silicon compound used was a commercial 1,1,1,3,3,3-hexamethyldisilazane (HMDS) $(CH_3)_3SiNHSi(CH_3)_3$, which was vaporized at a temperature of 200° C. The vaporized silicon compound was transferred by means of a nitrogen flow in to the reaction chamber where the pre-treated alumina was located. The support was kept at a temperature of 200° C. The silicon compound was transferred through the alumina bed, whereupon the chemically reactive bonding sites on alumina surface reacted with the silicon compound gas, forming on the surface of the alumina a layer containing the silicon compound. The feeding in of the silicon compound was discontinued, and the reaction chamber was rinsed with nitrogen at 200° C. in order to remove any unreacted and weakly bonded (physisorption) HMDS. The silicon compound adsorbed to the alumina surface was converted to oxide form by heat-treating it with dry air at a temperature of at maximum 550° C. The amount of carbon determined from the modified alumina specimen after the treatment was low ($\leq$0.1 wt. % C).

The (HMDS+air) treatment described above is called in this context as one cycle. The alumina surface was further modified using two (2), five (5) and eight (8) cycles. The silicon contents determined from these specimens were 2.0, 4.7 and 8.1 wt. % Si, respectively.

Example 2

Preparation of an aluminium oxide-modified silica support via gas phase

The support used was a commercial (Grace 432) silica having a particle size of 0.5–1.0 mm. It was heat-treated in air at a temperature of 600° C. for several hours in order to stabilize the surface structure. After the heat-treating, the silica BET surface area of 330 $m^2$/g and pore volume of 1.2 $cm^3$/g was determined by a nitrogen sorption method.

The pre-treated silica was treated in a manner corresponding to that in Example 1 except that the reactor operated under a low vacuum (approx. 20–50 mbar) and that the modifying compound used was aluminium(III) acetylacetonate $Al(C_5H_7O_2)_3$. The temperature of the crucible containing the aluminium precursor and of the support was maintained at 190° C. The aluminium compound was transferred through the silica bed, whereupon the chemically reactive bonding sites on silica surface reacted with the aluminium compound gas, forming on the surface of the silica a layer containing the aluminium compound. The feeding in of the aluminium compound was discontinued, and the reaction chamber was rinsed with nitrogen in accordance with Example 1. The aluminium compound adsorbed to the silica was converted to oxide form by heat-treating it with dry air at a temperature of at maximum 500° C., whereupon the acetylacetonato ligands decomposed. After the treatment, the amount of carbon determined from the modified silica specimen was low (approx. 0.3 wt. % C).

The ($Al(C_5H_7O_2)_3$+air) treatment described above is called as one cycle. The silica surface was further modified using two (2), five (5) and eight (8) cycles. The aluminium contents determined from these specimens were 2.9, 5.8 and 8.1 wt. % Al, respectively.

Example 3

Preparation of silicon oxide-modified alumina support by impregnation

The support used was a commercial alumina ($\gamma$-$Al_2O_3$, AKZO 000-1.5E) which was grounded, sieved and heat-treated in a manner corresponding to that described in Example 1. The pre-treated alumina was impregnated with 1,1,1,3,3,3-hexamethyldisilazane (HMDS) $(CH_3)_3SiNHSi(CH_3)_3$ at room temperature. Thereafter the support was dried at a temperature of 110° C. The alumina-impregnated silicon compound was converted to oxide form by heat-treating it in dry air at a temperature of 450° C. The silicon content determined from the modified alumina after the treatment was 1.1 wt. % Si.

When the impregnation was carried out using tetramethoxysilane $Si(OMe)_4$ or tetraethoxysilane $Si(OEt)_4$ compounds, the amounts of silicon were 1.7 and 1.3 wt. % Si, respectively.

Examples 4–9

Addition of platinum onto the modified and unmodified supports

Modified silica and alumina supports prepared according to Examples 1–3 were impregnated with 0.5 wt. % platinum from an aqueous solution using tetraammine-platinum(II) nitrate $[Pt(NH_3)_4](NO_3)_2$ as a source of platinum. After the impregnation, the catalysts were dried and calcined in a typical manner.

As a comparison, an unmodified alumina (AKZO 000-1.5E) was used as the support in Example 7, an unmodified silica (Crosfield EP-10) in Example 8, and a commercial Y-zeolite (TOSOH) in Example 9.

TABLE 1

| Example | Modification agent/Support | Number of cycles | Modification as in Example |
|---|---|---|---|
| 4 | Silicon oxide-modified alumina | 5 | 1 |
| 5 | Aluminum oxide-modified silica | 5 | 2 |
| 6 | Silicon oxide-modified alumina | 1 | 3 |
| 7 (comparative) | Alumina | — | — |
| 8 (comparative) | Silica | — | — |
| 9 (comparative) | Y-zeolite | — | — |

Catalyst testing

The platinum catalysts prepared in Examples 4–9 were tested using a microreactor apparatus in a fixed-bed tubular reactor. The catalysts were tested with respect to both hydrogenation activity and sulphur tolerance. The feed oil used was a paraffinic model substance representing the middle distillates, to which aromatic compounds and sulphur compounds were added. The feed selected was a hydrogenated tall oil fatty acid (TOFA-HYD) to which 3 wt. % toluene was added as the aromatic component. Hydrogenated TOFA is a pure paraffinic fraction containing mainly $C_{17}$ and $Cl_{18}$ normal paraffins. The sulphur tolerance of the catalysts was tested by adding to the feed approx. 50 ppm of sulphur as benzothiophene. The reactor pressure (50 bar), the space velocity (3.0 $hr^{-1}$) and the hydrogen to oil ratio (600 Nl/l) were maintained constant in all of the tests. Before testing, the catalysts were diluted to the same platinum concentration by means of either silicon carbide or alumina, depending on the catalyst.

FIG. 1 shows the catalytic activity of the tested catalysts in a sulphur-containing feed (50 ppm S) as a function of the reaction temperature.

As will appear from FIG. 1, the unmodified supports—both alumina and silica—had more poor performance in the test reaction than the modified supports prepared according to the invention. The sulphur tolerance of the silica-supported Pt catalyst was very poor, and even in the case of the alumina support, in a sulphur-containing feed a 50% conversion was obtained at a temperature above 300° C. The performance behavior of the gas phase modified supports, i.e. aluminium oxide-modified silica and silicon oxide-modified alumina, in the test reaction was quite similar to each other. In a sulphur-containing feed the temperatures rose to above 200° C., being, however, at maximum 250° C. at a conversion level of 100%. The catalysts thus modified tolerated well a sulphur level of 50 ppm, because in both cases a conversion of 100% after a change to sulphur-free feed was achieved at the same temperature (190° C.) as was before the adding of sulphur.

The activity of silicon oxide-modified (HMDS as precursor) alumina-based platinum catalyst prepared by impregnation was in a sulphur-containing feed somewhat higher than the activity of the catalysts prepared on a gas phase modified supports. A conversion level of 50% was achieved with this catalyst at a temperature of approx. 200° C., which was the best value for the catalysts tested.

FIG. 1 shows, as a comparison, also the activity of a platinum catalyst prepared on Y-zeolite. In a sulphur-containing feed a conversion level of 50% was achieved at approximately the same temperature as with modified supports. However, the sulphur tolerance of the zeolite-based catalyst was high, which was previously known, since a 100% conversion after a change to a sulphur-free feed was achieved at a temperature of approx. 185° C.

On the basis of the results, the performance of alumina and silica supports modified according to the invention was in the test reaction as good as that of the Y-zeolite support, but clearly better than that of unmodified supports, $\gamma$-$Al_2O_3$ and $SiO_2$. This was the case for both sulphur-free feed and sulphurous feed. For platinum catalysts prepared on modified supports and on Y-zeolite, the temperature difference between a sulphur-free and a sulphur-containing feed was approx. 50° C., regardless of conversion level.

What is claimed is:

1. A catalyst with high sulphur tolerance for the hydrogenation of middle distillate aromatics, comprising a hydrogenating component selected from the group consisting of metals belonging to the platinum group on an oxide support wherein said support comprises
   (a) an alumina, the surface of which has been modified by contacting it with a silicon-containing compound, or
   (b) a silica, the surface of which has been modified by contacting it with an aluminum-containing compound, said silicon- or aluminum-containing compound being present in the oxide form.

2. The catalyst according to claim 1, comprising alumina as a support which has been surface modified by reacting a silicon-containing gaseous compound with the support at a temperature which is higher than the condensation temperature of the silicon compound used but lower than the decomposition temperature of the said compound, and during a period of time sufficiently long for achieving chemisorption of the alumina to the silicon-containing compound.

3. The catalyst according to claim 2, wherein the surface modification has been carried out at a temperature of 20–600° C.

4. The catalyst according to claim 1, wherein the modification of the alumina support with a silicon compound has been carried out by impregnating the alumina with a solution which contains the silicon compound.

5. The catalyst according to any of claims 2 to 4, wherein said silicon compound is selected from the group consisting of silicon tetrachloride, metalorganic silicon compounds and organic silicon compounds.

6. The catalyst according to claim 1, comprising silica as a support which has been surface modified by reacting an aluminum-containing gaseous compound with the support at a temperature which is higher than the condensation temperature of the aluminum compound used but lower than the decomposition temperature of said compound, and during a period of time sufficiently long for achieving chemisorption of the silica to the aluminum-containing compound.

7. The catalyst according to claim 6, wherein the surface modification has been carried out at a temperature of 20–600° C.

8. The catalyst according to claim 1, wherein the modification of the silica support with an aluminum compound has been carried out by impregnating the silica with a solution which contains the aluminum compound.

9. The catalyst according to any of claims 6 to 8, wherein said aluminum compound is selected from the group consisting of aluminum chloride, metalorganic aluminum compounds and organometallic compounds.

10. The catalyst according to claim 1, wherein said silicon-containing compound or said aluminum-containing compound has been converted to oxide form by an air, oxygen or water treatment carried out at a temperature of 20–600° C.

11. The catalyst according to claim 1, wherein the amount of said silicon compound or the said aluminum compound on the support is 0.1–30 wt. %.

12. The catalyst according to claim 1, the platinum group metal is platinum, palladium or a mixture thereof.

13. The catalyst according to claim 12, wherein the platinum group metal has been added by impregnating the support with an aqueous solution of tetraammineplatinum (II) nitrate, tetraammineplatinum(II) chloride or hexachloroplatinic acid.

14. The catalyst according to claim 12, wherein the platinum group metal has been added from gas phase onto the support by using platinum(II) acetylacetonate or bis(2,2,6,6-tetramethyl-3,5-heptanedionato)platinum as precursor.

15. The catalyst according to any of claims 12 to 14, comprising the platinum group metal in an amount of 0.1–10 wt. %.

16. A process for preparing a catalyst with high sulphur tolerance for the hydrogenation of middle distillate aromatics, comprising the step of depositing a hydrogenating component selected from the group consisting of metals belonging to the platinum group on an oxide support, characterized by modifying the support by contacting the surface of an alumina support with a silicon-containing compound in order to deposit said silicon-containing compound on the alumina support, or the surface of a silica support with an aluminum-containing compound in order to deposit said aluminum-containing compound on the silica support, and converting said silicon- or aluminum-containing compound to the corresponding oxide form.

17. The process according to claim 16, comprising contacting the support with a silicon or aluminum-containing gaseous compound at a temperature which is higher than the condensation temperature of the silicon- or aluminum-containing compound used but lower than the decomposition temperature of the said compound, and during a period of time sufficiently long for achieving chemisorption of the support to the silicon- or aluminum-containing compound.

18. The process according to claim 16, wherein said silicon-containing compound or said aluminum-containing compound is converted to oxide form by treatment of the support with air, oxygen or water.

19. The process according to any of claims 16 to 18, wherein the amount of silicon oxides on alumina support or the amount of aluminum oxides on silica support is controlled by repeating the reaction sequence wherein the silicon compound or the aluminum compound, is introduced onto the support and the structures thus obtained are treated with air, oxygen or water.

20. The process according to claim 16, wherein the modification of the support is carried out by impregnating the support with a solution of a silicon or aluminum compound.

21. The process according to claim 16, wherein, before the surface modification procedure, the support surface state is stabilized by heat-treating it at a temperature of 200–900° C.

22. The catalyst according to claim 3, wherein the surface modification has been carried out at a temperature of 20–300° C.

23. The catalyst according to claim 4, wherein the metalorganic silicon compound is siliconalkoxide.

24. The catalyst according to claim 4, wherein the organic silicon compound is 1,1,1,3,3,3-hexamethyldisilazone.

25. The catalyst according to claim 6, wherein the surface modification has been carried out at a temperature of 20–300° C.

26. The catalyst according to any of claims 6–8, wherein said metalorganic aluminum compound is aluminum ethoxide.

27. The catalyst according to any of the claims 6–8, wherein said metalorganic aluminum compound is aluminum (III) acetylacetonate.

28. The catalyst according to any of claims 6–8, wherein said metalorganic aluminum compound is tris(2,2,6,6 tetramethyl-3,5-heptanedionato) aluminum.

29. The catalyst according to any of claims 6–8, wherein said organometallic compound is trimethylaluminum or triethylaluminum.

30. The catalyst according to claim 1, wherein said silicon-containing compound or said aluminum-containing compound has been converted to oxide form by an air, oxygen, or water treatment carried out at a temperature of 300–600° C.

31. The catalyst according to claim 1, wherein the amount of said silicon compound or the said aluminum compound is 0.5–10 wt %.

32. The catalyst according to any of claims 12–14, wherein the platinum group metal is in a amount of 0.3–3wt %.

* * * * *